(12) United States Patent
Seddigh et al.

(10) Patent No.: US 7,529,480 B2
(45) Date of Patent: May 5, 2009

(54) METHOD AND SYSTEM FOR LIGHT PATH MONITORING IN AN OPTICAL COMMUNICATION NETWORK

(75) Inventors: Nabil Seddigh, Ottawa (CA); Biswajit Nandy, Ottawa (CA); Paul David Obeda, Ottawa (CA); Douglas Heath Patriarche, Ottawa (CA); Udo Mircea Neustadter, Ottawa (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 548 days.

(21) Appl. No.: 10/725,025

(22) Filed: Dec. 2, 2003

(65) Prior Publication Data

US 2004/0120710 A1    Jun. 24, 2004

Related U.S. Application Data

(60) Provisional application No. 60/431,725, filed on Dec. 9, 2002.

(51) Int. Cl.
*H04B 10/08* (2006.01)
*H04B 17/00* (2006.01)
*H04J 14/02* (2006.01)

(52) U.S. Cl. ............................. 398/14; 398/16; 398/17; 398/57

(58) Field of Classification Search .................... 398/57, 398/10–14, 16, 17
See application file for complete search history.

(56) References Cited

U.S. PATENT DOCUMENTS

| | | | |
|---|---|---|---|
| 6,347,079 B1 * | 2/2002 | Stephens et al. | ............ 370/255 |
| 6,570,867 B1 | 5/2003 | Robinson et al. | |
| 6,973,023 B1 * | 12/2005 | Saleh et al. | .................. 370/217 |
| 6,980,736 B1 * | 12/2005 | Fee et al. | ........................ 398/19 |
| 7,009,934 B1 * | 3/2006 | Perkins et al. | ............... 370/228 |
| 7,016,607 B1 * | 3/2006 | Carrick et al. | ................. 398/32 |
| 7,035,544 B1 * | 4/2006 | Won | ............................ 398/79 |

(Continued)

FOREIGN PATENT DOCUMENTS

CA    2298848    10/2000

OTHER PUBLICATIONS

Sengupta, S. et al. "From network design to dynamic provisioning and restoration in optical cross-connect mesh networks: an architectural and algorithmic overview." IEEE Network, Jul./Aug. 2001, vol. 15, No. 4: 46-54.*

(Continued)

*Primary Examiner*—Ken N Vanderpuye
*Assistant Examiner*—David S Kim
(74) *Attorney, Agent, or Firm*—Victoria Donnelly

(57) ABSTRACT

A method for monitoring lightpaths in an optical network comprising nodes interconnected by wavelength-multiplexed links is disclosed. Each lightpath is identified by a respective optical signature. A node stores identifiers of optical signatures of lightpaths designated to traverse the node and identifiers of adjacent nodes. Each node also maintains a record of all optical signatures it detects. A command-line interface associated with a selected node tracks a selected lightpath, designated to traverse the selected node, by propagating messages in an upstream direction, a downstream direction, or both, requesting other nodes to provide information pertinent to the selected lightpath. The selected node may also send messages to all its neighboring nodes requesting each to indicated detection, or otherwise, of the selected lightpath. Thus, the method relies on localized information, maintained at each node, and cooperative exchange of data among nodes without interacting with a centralized network management facility.

11 Claims, 6 Drawing Sheets

U.S. PATENT DOCUMENTS

| | | | | |
|---|---|---|---|---|
| 7,120,118 | B2* | 10/2006 | Rajagopal et al. | 370/237 |
| 7,218,852 | B1* | 5/2007 | Sharma | 398/48 |
| 7,242,862 | B2* | 7/2007 | Saunders et al. | 398/30 |
| 2006/0031573 | A1* | 2/2006 | Feutz et al. | 709/238 |
| 2008/0008102 | A1* | 1/2008 | Bardalai et al. | 370/242 |
| 2008/0131126 | A1* | 6/2008 | Gerstel et al. | 398/79 |

OTHER PUBLICATIONS

Ghani, N. "Lambda-labeling: A framework for IP-over-WDM using MPLS." Optical Networks Magazine. Apr. 2000: 45-58.*

Heismann, F. et al. "Signal tracking performance monitoring in multi-wavelength optical networks." 22nd European Conference on Optical Communication, 1996. ECOC '96. vol. 3. Sep. 15-19, 1996: 47-50.*

Rajagopalan, B. et al. "IP over optical networks: architectural aspects." IEEE Communications Magazine, vol. 38, No. 9, Sep. 2000: 94-102.*

Weik, Martin H. "database", "distributed control", "distributed database". Fiber Optics Standard Dictionary. 3rd ed. 1997.*

* cited by examiner

METHOD AND SYSTEM FOR LIGHT PATH MONITORING IN AN OPTICAL COMMUNICATION NETWORK

RELATED APPLICATION

This application claims priority from U.S. Provisional Patent Application Ser. No. 60/431,725 to Seddigh, N., et al, entitled "Method and Apparatus for Tracing Optical Lightpath Via Command Line Interface" and filed on 9 Dec., 2002.

FIELD OF INVENTION

This invention relates to optical communication systems and in particular to a method and system for monitoring a light path between a source and a destination node in an Optical Communication Network (OCN), e.g., for the purpose of detecting connectivity problems.

BACKGROUND OF INVENTION

In order to cost effectively manage OCNs, service providers need trouble-shooting and maintenance tools with visibility at the granularity of individual light paths or wavelengths. Due to the complexity of the optical layer sophisticated optical monitoring was a challenge in OCNs. Hence the need for improved Optical-layer Performance Monitoring (OPM) has been acknowledged, followed by the development of several commercial solutions. While most of these solutions focus on detailed spectral analysis, providing high-resolution wavelength, power and signal to noise ratio measurements, they do not provide any information about the course a particular light path has taken through the network. Network operators spend an inordinate amount of time troubleshooting connectivity problems in their networks. Internet Protocol (IP) networks have extremely useful tools such as IP Traceroute or Link-State Packet (LSP) Traceroute to assist the network operator. IP Traceroute, for example, is a standard tool, on which many network operators rely. Leveraging a known paradigm is easy to use, explain and demonstrate.

Canadian Patent Application Serial No. 2,298,848 to Robinson, Marc C., et al, filed on 15 Feb. 2000 and entitled "Routes and Path Management", and corresponding U.S. Pat. No. 6,570,867 issued on 27 May 2003 and also entitled "Routes and Paths Management", describe a cost-effective and efficient framework for management of telecommunications networks. The invention is embodied in a route and path management system that contains a data collector unit for collecting data from individual network elements, a server for processing the collected data into manageable route and path objects and a graphical user interface for a user to manage or monitor routes in an IP network. Most of the prior art, including the above-mentioned patent application, concerns tracing of routes at the IP level and does not address optical light path tracing. Some of these capabilities are available from Network Management Systems (NMS). Use of a commercial off-the-shelf NMS requires the OCN to be compatible with the NMS product. Moreover, it may not be possible to provide a network management port at each node in the OCN because of the increase in cost.

Accordingly, there is a need in the industry for the development of methods and systems for detecting and monitoring light paths of optical signals propagating in optical networks.

SUMMARY OF THE INVENTION

Therefore there is an objective of the invention to provide a method and system for detecting and monitoring a light path between a source and a destination node in an OCN which will not require NMS interaction or any optical to electrical signal conversion.

The present invention relates to a Command Line Interface (CLI) based method and system (i.e., not based on any centralized global knowledge) for tracing the nodes traversed by an optical light path between a source node and a destination node in an OCN.

According to one aspect of the invention there is provided a method for monitoring a light path between a source node and a destination node in an Optical Communication Network (OCN) using a Command Line Interface (CLI), the method comprising the steps of executing a procedure called Trace for tracing an existing light path between the source node and the destination node in the OCN; executing a procedure called Walk for identifying a potential light path between the source node and the destination node in the OCN, and executing a procedure called Global Discovery for identifying the nodes that are traversed by the light path existing between the source node and the destination node in the OCN, executing a procedure called Local Discovery for identifying the nodes that are traversed by the light path existing between the source node and the destination node in the OCN, wherein the light path to be monitored includes a start node where monitoring is invoked through the CLI. The step of executing the procedure called Trace comprises the steps of constructing lists of nodes that are on the light path to be monitored, and displaying said lists of nodes. The step of constructing the lists of nodes, comprises the steps of constructing a list of nodes that are traversed in sequence by the light path from the start node to the source node as RESULT_LIST1, and constructing the list of nodes that are traversed in sequence by the light path from the start node to the destination node as RESULT_LIST2. The step of constructing RESULT_LIST1 comprises the step of identifying all nodes pre-provisioned to be on the light path that have detected and processed a wavekey corresponding to the light path wherein the wavekey is a signature that uniquely identifies the light path. The step of constructing RESULT_LIST2, comprises the step of identifying all nodes pre-provisioned to be on the light path that have detected and processed the wavekey corresponding to the light path wherein the wavekey is a signature that uniquely identifies a light path. The step of displaying list of nodes comprises the step of displaying RESULT_LIST1 and RESULT_LIST2.

The procedure called Walk comprises the steps of constructing lists of nodes that are provisioned with expected wavekey to be present on the light path to be monitored, and displaying said lists of nodes. The step of constructing lists of nodes that are provisioned with expected wavekey to be present on the lightpath to be monitored comprises the steps of constructing the list of nodes that are provisioned to be present with expected wavekey on the light path from the start node to the source node as RESULT_LIST1, and constructing the list of nodes that are provisioned to be present on the light path from the start node to the destination node as RESULT_LIST2. The step of constructing RESULT_LIST1 comprises the step of identifying nodes that are provisioned to process the expected wavekey corresponding to the light path, wherein the wavekey is a signature that uniquely identifies the light path. The step of constructing RESULT_LIST2 comprises the step of identifying nodes that are provisioned to process the expected wavekey corresponding to the light path, wherein the wavekey is a signature that uniquely identifies the light path. The step of displaying the lists of nodes comprises the step of displaying RESULT_LIST1 and RESULT_LIST2.

The procedure called Global Discovery comprises the steps of flooding the OCN; and displaying a list of nodes traversed by the light path. The step of flooding the OCN comprises the steps of retrieving the list of all optical nodes in the OCN from the CN (Control Network) topology information and sending messages to all the optical nodes enquiring whether they have processed the wavekey corresponding to the light path and requesting all the nodes that have detected the wavekey to reply back to the start node with an affirmative acknowledgement.

The procedure called Local Discovery comprises the steps of constructing lists of optical nodes detected via local neighbour discovery, and displaying a list of nodes traversed by the light path. The step of constructing lists of optical nodes detected via local neighbour discovery comprises the steps of sending messages to all neighbouring nodes discovered via the CN (Control Network) topology information enquiring whether they have processed the wavekey corresponding to the light path and requesting all the nodes that have detected and processed the wavekey to request their neighbouring nodes (discovered via the CN topology information) to reply back to the start node if they have processed the wavekey.

According to another aspect of the invention there is provided a system for monitoring a light path between a source node and a destination node in an Optical Communication Network (OCN) using a Command Line Interface (CLI), the system comprises means for executing a procedure called Trace for tracing an existing light path between the source node and the destination node in the OCN, means for executing a procedure called Walk for identifying a potential light path between the source node and the destination node in the OCN, and means for executing a procedure called Global Discovery for identifying the nodes that are traversed by the light path existing between the source node and the destination node in the OCN means for executing a procedure called Local Discovery for identifying the nodes that are traversed by the light path existing between the source node and the destination node in the OCN, wherein the light path to be monitored includes a start node where monitoring is invoked through the CLI. The means for executing the procedure called Trace comprises means for constructing lists of nodes that are on the light path to be monitored and means for displaying said lists of nodes. The means for constructing the lists of nodes comprises means for constructing a list of nodes that are traversed in sequence by the light path from the start node to the source node, as RESULT_LIST1 and means for constructing the list of nodes that are traversed in sequence by the light path from the start node to the destination node, as RESULT_LIST2. The means for constructing RESULT_LIST1 comprises means for identifying all nodes that have processed a wavekey corresponding to the light path, wherein the wavekey is a signature that uniquely identifies the light path. The step of constructing RESULT_LIST2 comprises means for identifying all nodes that have used the wavekey corresponding to the light path, wherein the wavekey is a signature that uniquely identifies a light path. The means for displaying the list of nodes comprises means for displaying RESULT_LIST1 and RESULT_LIST2.

The means for executing the procedure called Walk comprises means for constructing lists of nodes that are provisioned with expected wavekey to be present on the light path to be monitored and means for displaying said lists of nodes. The means for constructing lists of nodes that are provisioned with expected wavekey to be present on the light path to be monitored comprises means for constructing the list of nodes that are provisioned with expected wavekey to be present on the light path from the start node to the source node as RESULT_LIST1, and means for constructing the list of nodes that are provisioned with expected wave key to be present on the light path from the start node to the destination node as RESULT_LIST2. The means for constructing RESULT_LIST1 comprises means for identifying nodes that are provisioned with expected wavekey to process the wavekey corresponding to the light path, wherein the wavekey is a signature that uniquely identifies the light path. The means for constructing RESULT_LIST2 comprises means for identifying nodes that are provisioned with expected wavekey to process the wavekey corresponding to the light path, wherein the wavekey is a signature that uniquely identifies the light path.

The means for executing the procedure called Global Discovery comprises means for flooding the OCN, and means for displaying a list of nodes traversed by the light path. The means for flooding of the OCN comprises means for retrieving the list of all optical nodes in the OCN from the CN (Control Network) topology information and means for sending messages to all the optical nodes enquiring whether they have processed the wavekey corresponding to the light path and means for requesting all the nodes that have detected the wavekey to reply back to the start node with an affirmative acknowledgement The means for executing the procedure called Local Discovery comprises means for constructing lists of optical nodes detected via local neighbour discovery and means for displaying a list of nodes traversed by the light path. The means for constructing lists of optical nodes detected via local neighbour discovery comprises means for sending messages to all neighbouring nodes discovered via the CN (Control Network) topology enquiring whether they have detected and processed the wavekey corresponding to the light path, and means for requesting all the nodes that have detected and processed the wavekey to request their neighbouring nodes (discovered via the CN topology information) to reply back to the start node if they have processed the wavekey.

Thus, the method and system of the embodiments of the invention provides a tool for optical light path tracing that does not use a NMS, but determines the nodes that a light path is traversing through a CLI. The invention deploys Tropic's Wavelength Tracker technology as described in detail in the following three patent applications and one patent, incorporated herein by reference:

(1) TR-041 (OBEDA) U.S. patent application Ser. No. 09/963,501 to Obeda, P. D., et al, entitled "Topology Discovery in Optical WDM Networks", filed on 27 Sep. 2001;

(2) TR-074 (CIP#2) (WAN) U.S. patent application Ser. No. 10/263,959 to Wan, P. W., et al, entitled "Channel Identification in Communications Networks", filed on 4 Oct. 2002;

(3) TR-119-CIP (OBEDA) U.S. patent application Ser. No. 10/452,511 to Obeda, P. D., et al, entitled "Method and System for Identification of Channels in an Optical Network", filed on 3 Jun. 2003; and (4) TR-075 (JIN) U.S. Pat. No. 6,597,161 to Jin, D., et all, entitled "Method and Apparatus for Spectrum Analysis With Variable Detection Latency and Multiple Layer coherent Integrations", which issued on 22 Jul. 2003, which technology is used in conjunction with Transmission Control Protocol/User Datagram Protocol (TCP/UDP) messaging and a neighbor discovery technique for tracing the end-to-end light path. The main advantage of this tool is that it does not use a specific NMS but can be executed from a CLI on any node of the light path.

BRIEF DESCRIPTION OF THE DRAWINGS

Further features and advantages of the invention will be apparent from the following description of the embodiment, which is described by way of example only and with reference to the accompanying drawings, in which.

DETAILED DESCRIPTION OF THE INVENTION

Figure 1:
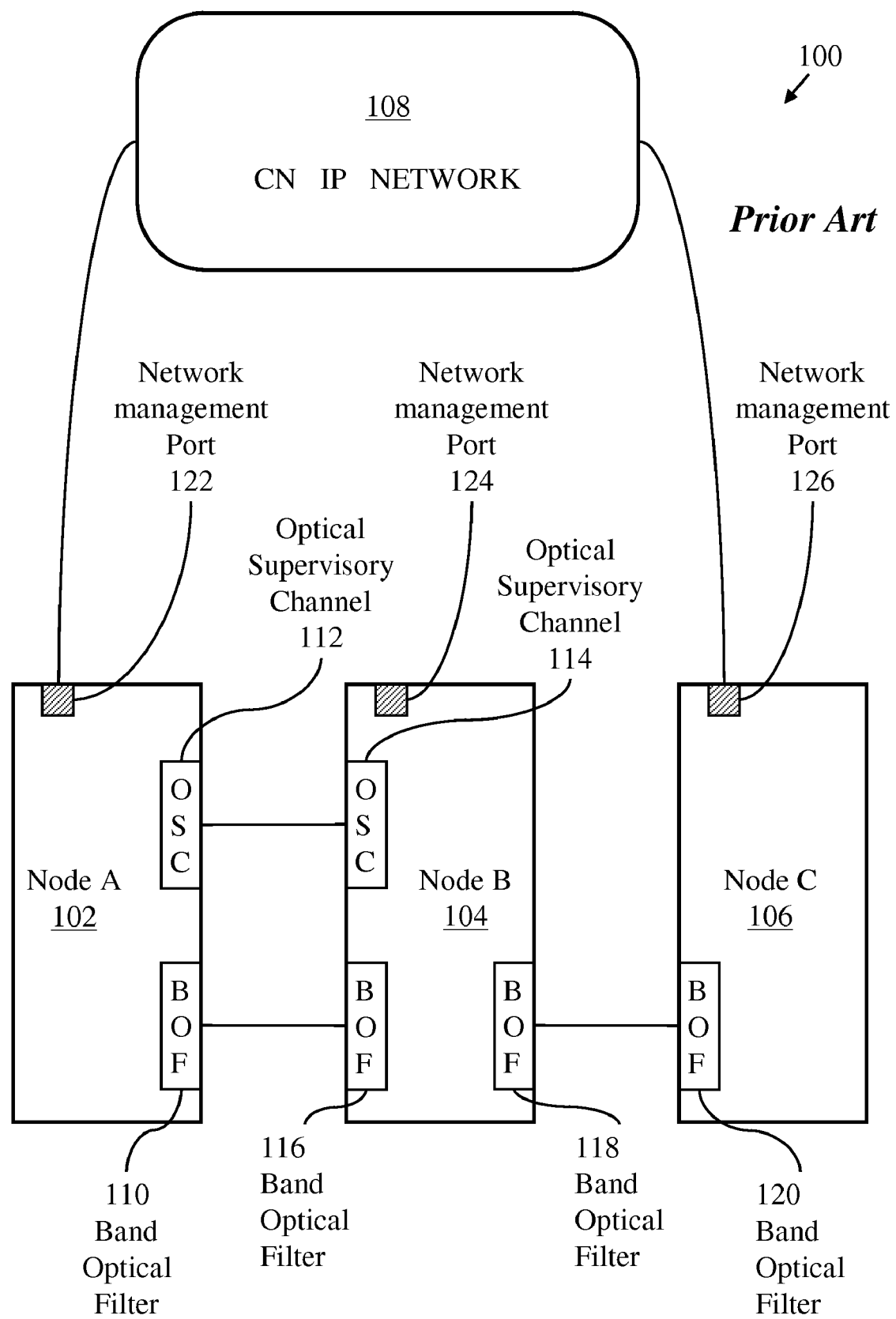
FIG. 1 presents a system that illustrates the relationship between an OCN and its associated Control Network (CN)

A method for light path monitoring in an optical network will be described with respect to an OCN 100 and its associated CN presented in FIG. 1 as an example. The system has three nodes: node A 102, node B 104, and node C 106. CN is an IP network used for exchanging control messages among optical nodes. Each of the nodes in this example is equipped with respective network management ports 122, 124, and 126. A node may be connected to the CN that is an IP network through a network management port. In this example, node A and B are connected to the CN (see FIG. 1). Each node A, B, and C is equipped with Band Optical Filter Linecards (BOFs) 110, 116, 118 and 120 respectively for handling the optical signal. The BOF 110 in node A is connected to the BOF 116 in node B. BOF 118 in node B is connected to BOF 120 in node C. Note that control messages are routed from one node to another using both the CN as well as Optical Supervisory Channels (OSC) in the OCN. Nodes A and B in this example are equipped with OSC cards 112 and 114 respectively. Every node in the optical network has a connection to the CN (either directly or via other nodes). By retrieving the CN topology information, one optical node can learn about the existence of all other optical nodes in the OCN. Adjacency information for nodes on the CN is available to the system. If OSC cards are used between 2 nodes, this adjacency will appear in the CN topology. In such configurations, the CN adjacency information can be used to reflect optical node adjacency connectivity—this information will be automatically available to nodes. In cases where the OSC cards are not used (between Node B and Node C), the adjacency between these two nodes is to be statically provisioned at each node. Each node is given the neighbour's router identification (Router ID).

Monitoring a light path for identifying connectivity problems is achieved by exchanging inter-node messages using both the CN and the OSCs in the OCN. Such connectivity problems include the existence of failure points in a light path, mis-fibering as well using incorrect provisioning information at nodes. The light path to be monitored can be identified using Wavelength Tracker technology. The Wavelength Tracker technology applies a unique optical signature to each wavelength at the DWDM layer. The signature allows the system to distinguish between multiple instances of the same colour traveling through the network.

The unique signature is conceptually equivalent to an identification tag or label commonly used by MPLS (Multi-Protocol Label Switch) paths in an IP network. The optical signature (also called a WaveKey) is applied to the optical signal at the source node of the light path. The optical signature is detectable at intermediate nodes on the light path via inexpensive decoders present on line cards. Detection of the optical signature is accomplished without an OEO (Optical-Electrical-Optical) conversion at intermediate nodes, thus resulting in a cost-effective solution. Wavelength Tracker technology is used for a variety of applications including optical power monitoring and loss of light avoidance. This invention describes the use of Wavelength Tracker as part of a CLI-based system to achieve the tracing and fault detection of light paths. The technology for generating a wavekey has been described in three U.S. patent applications and one U.S. patent, listed in Paragraph No. 16 above, and incorporated herein by reference.

The method for monitoring a light path of a signal in the optical network of the embodiment of the invention includes four procedures: Trace, Walk, Global Discovery and Local Discovery for identifying connectivity problems. These procedures do not require any Network Management System (NMS) interaction. Trace (Light path Trace), Walk, Global Discovery and Local Discovery can be invoked from a Command Line Interface (CLI). A brief description of each of these procedures is provided next.

Figure 2:
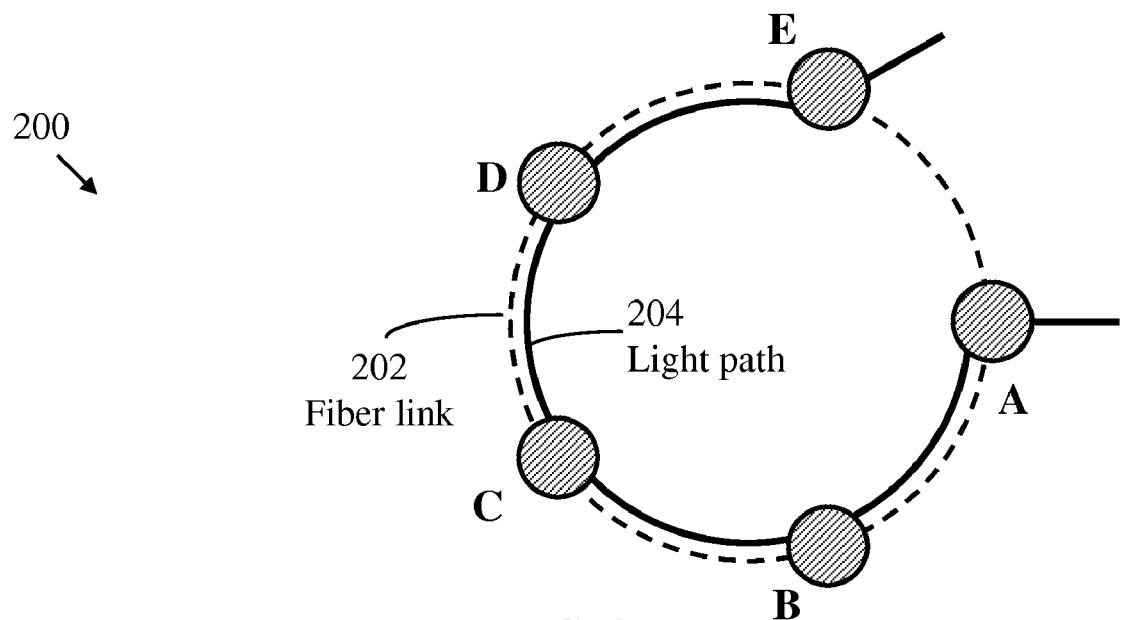
FIG. 2 shows an example of OCN.
Figure 3:
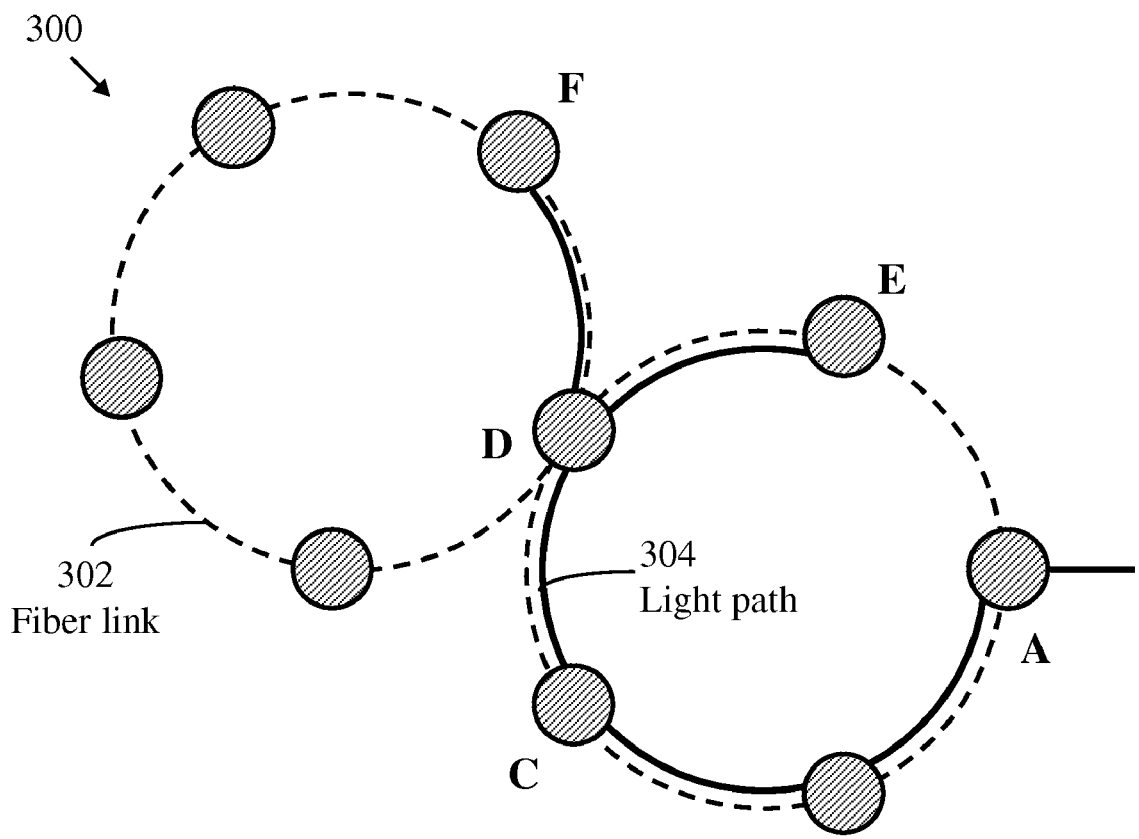
FIG. 3 presents an example of OCN with mis-fibering.

The procedure called Trace is used to verify the sequence of nodes expected to be traversed by a specific light path—it can be used to detect misconfiguration problems. In traversing the light path, nodes are communicated in sequence and asked whether they have detected the wavekey specific to the light path being traced. The expected downstream (or upstream) node in the light path is discovered via provisioning information on the node currently being visited. Although it is typically executed from the head (source) node of the light path, the command for the Trace procedure can be executed from any node along the light path. The result of the procedure is to display the list of nodes traversed from the start node to the destination node of the light path as well as the list of nodes traversed from the source node to the start node. For example, an OCN in FIG. 2 has nodes A, B, C, D, and E that are connected by a fiber (shown by the dashed line 202). The solid line 204 through these nodes displays a light path. If the command for tracing a light path identified by a given wavekey is executed at start node C, two lists, RESULT_LIST1 {C-B-A} and RESULT_LIST2 {C-D-E} will be displayed. RESULT_LIST1 contains the sequence of nodes along the light path in the receive direction (upstream) from the start node. RESULT_LIST2 contains the sequence of nodes along the light path in the transmit direction from the start node (downstream). If the start node is the source node for the light path A, RESULT_LIST1 is {A-B-C-D-E} where as RESULT_LIST2 is empty. FIG. 3 displays an example of mis-fibering. Nodes A, B, C, D and F are connected by a fiber (shown by a dashed line 302) whereas the provisioned light path is expected to traverse nodes A, B, C, D, and E (shown by a solid line 304). For a start node of A in FIG. 3, RESULT_LIST1 is given by {A-B-C-D} while RESULT_LIST2 is empty. Note that since D is mis-fibered to F, RESULT_LIST1 terminates at D.

The procedure Walk is similar to Trace except that it is used primarily before setting up a light path for knowing the sequence of nodes that will be traversed if the light path identified by a given wavekey is set up. Since the light path is yet to be set up, network provisioning information at the nodes is used for generating RESULT_LIST1 and RESULT_LIST2. Invoking Walk at node C and node A in FIG. 2 will produce the exact same result as obtained with Trace. However, with a start node of A in FIG. 3, a RESULT_LIST1 of {A-B-C-D-E} and an empty RESULT_LIST2 is obtained. Note that in comparison to the RESULT_LIST1 obtained with Trace, an additional node E is displayed in case of Walk. This is because Walk uses the static provisioning information only that indicates that E is the neighbour of node D for the given light path with the expected wavekey. In reality, however, when light path is set up, the light path will extend from D to F due to the mis-fibering of D to F.

The procedure Global Discovery is used to determine all the nodes that a given light path visits in a network. The list of nodes produced is not necessarily ordered in the same sequence of nodes the light path traverses from its source to its destination. Global Discovery is useful as a complement to Trace in trouble-shooting cases of mis-fibering or adding/dropping channels to the wrong port. It is especially useful when the mis-fibering is not to a known neighbour node. Invocation of procedure Global Discovery at start node A in the system in FIG. 2 could produce a number of results including {A,D,C,B,E} or {A,B,C,D,E} or {A,B,D,C,E}. Invoking Global Discovery at start node A in FIG. 3 could produce a number of results including {A,B,C,D,F} or {A,C, F,D,B} or {A,F,D,B,C}.

The procedure Local Discovery is useful in cases of mis-fibering. Not only does it detect mis-fibering has occurred, it may be able to indicate which node the mis-fibering terminates on. However, it can only be used if nodes use an OSC card to connect to every other node with which they have a regular optical link. Local Discovery identifies the actual path traversed by a light path including unexpected nodes. It is less invasive than Global Discovery as it does not need to contact every single node in the network. Local Discovery produces a list of nodes that belong to a given light path. Though in most cases, the displayed order of nodes will represent the sequence of nodes a light path traverses, there are some cases where the order of nodes in the list does not need to follow any sequence as in the case of Trace or Walk. Invocation of procedure Local Discovery at start node A in the system in FIG. 2 will produce a result of {A, B, C, D, E} or {A,E,D,C,B}. Invoking Discovery at start node C results in the list {C, D, E, B, A}. Invoking Local Discovery at start node A in FIG. 3 will result in the list {A, B, C, D, F} which is the exact sequence of nodes traversed by the light path.

Figure 4:
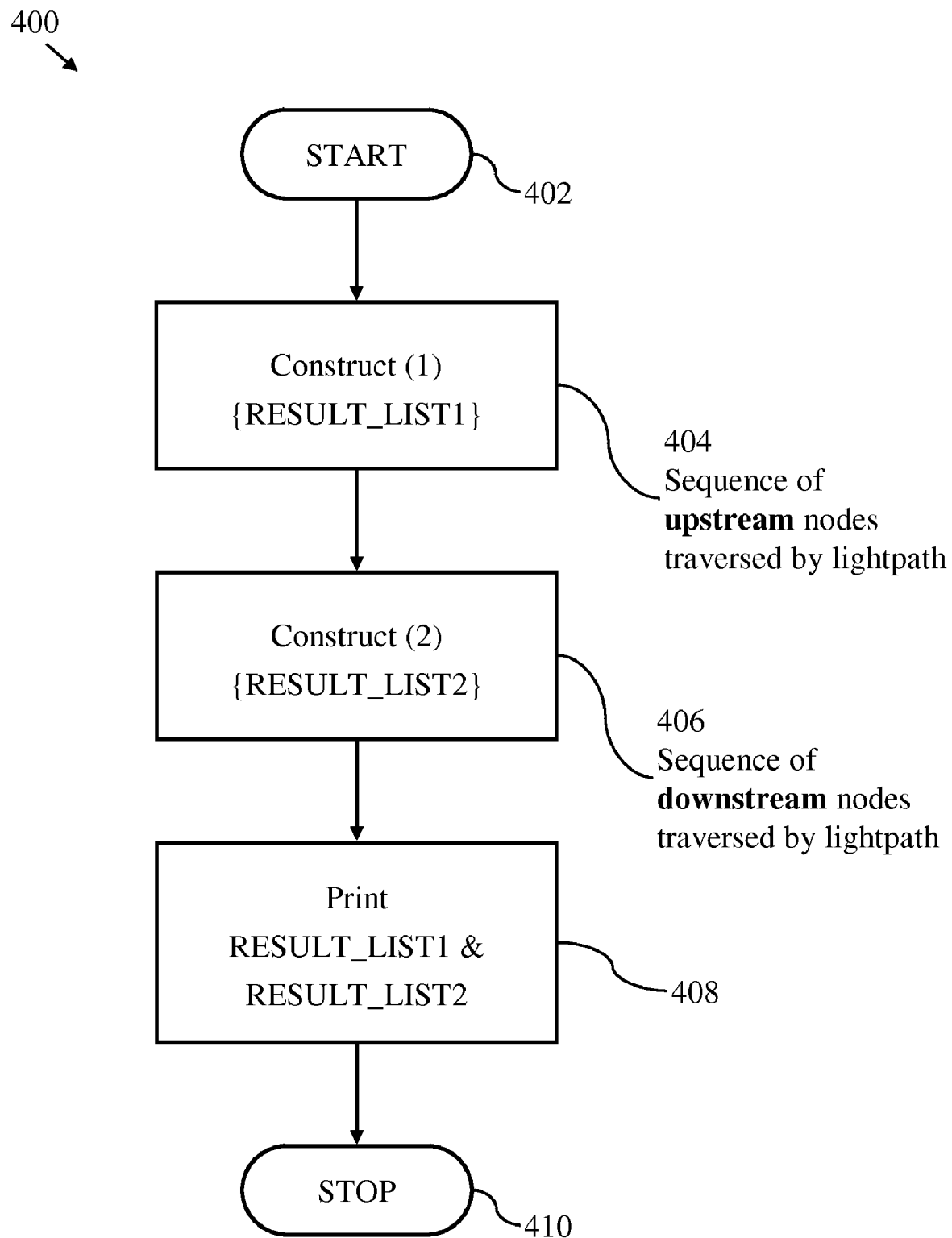
FIG. 4 presents a flowchart that illustrates the steps of the procedure Trace of the method for lightpath monitoring according to the embodiment of the invention.
Figure 5:
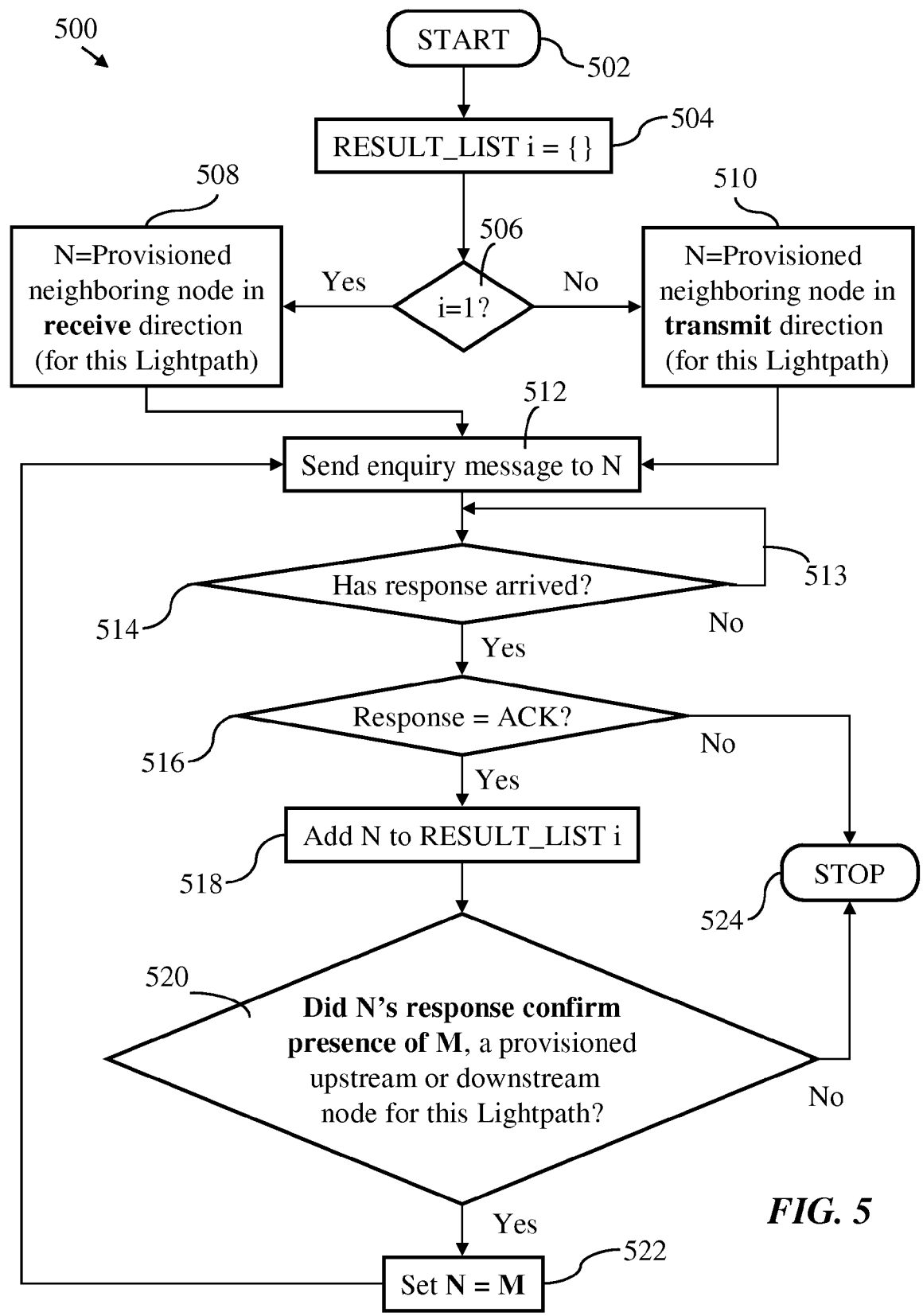
FIG. 5 presents a flowchart explaining the steps of the procedure Trace of FIG. 4 in more detail.

The operations of the procedure Trace are explained with the help of the flow charts 400 and 500 presented in FIGS. 4 and 5 respectively. Upon start (box 402 in FIG. 4) procedure Trace constructs RESULT_LIST1 (box 404) and RESULT_LIST2 (box 406). RESULT_LIST1 contains the sequence of nodes traversed by the light path in the receive direction (upstream) from start node whereas RESULT_LIST2 contains the sequence of nodes in the transmit direction (downstream) from start node. Note that there are two special cases. In the first, the start node is the source node for the light path. Since there is no other node in the receive direction RESULT_LIST1 is empty. In the second, the start node is the destination node for the light path. Since there is no other node in the transmit direction RESULT_LIST2 is empty. After computing RESULT_LIST1 and RESULT_LIST2 the two lists are printed (box 408) and the procedure terminates (box 410).

The detailed operations of procedure Construct (i), i=1,2 in the above example, that is used in the generation of RESULT_LIST1 and RESULT_LIST2(FIG. 4) are explained with the help of procedure 500 of FIG. 5. Upon start (box 502), the procedure 500 creates an initial empty list called RESULT_LISTi (box 504). If the argument "i" passed to the procedure is 1, the procedure exits "YES" from box 506 and sets the value of N to the provisioned neighbouring node (for this light path) of start node in the receive direction (box 508). Otherwise the procedure exits "NO" from box 506 and sets the value of N to the provisioned neighbouring node (for this light path) of start node in the transmit direction (box 510). A message is then sent to N enquiring whether it has detected the wavekey corresponding to the light path whose path is being traced (box 512). The procedure checks whether the response from N has arrived and exits "YES" from box 514 upon reception of the reply. Otherwise, it exits "NO" from box 514 and goes back to the top of the loop 513 and checks for the arrival of the response. The neighbouring node responds with an acknowledgement (ACK) if it has detected the specified wavekey indicating that it is on the light path being monitored. If the provisioning information at N indicates a subsequent provisioned node (M) on the same light path, the identification of this neighbouring node is included in the response. On the reception of an ACK, the procedure exits "YES" from box 516 and adds N to RESULT_LISTi. When N is an end node (start or destination node for the light path) no neighbouring node information is included in the response, and the procedure exits "NO" from box 520 and terminates (box 524). Otherwise, N is set to M—the neighbouring node returned with the response (box 522) and the procedure loops back to the entry of box 512 designated with reference numeral 511. The reception of a negative response in box 516 indicates that the currently polled node N, is not on the light path, and the procedure exits "NO" (from the box 516) and terminates (box 524).

The steps of procedure Walk are similar to those of procedure Trace. The only difference lies in the processing of the enquiry message sent by start node. The enquiry message indicates the expected wavekey. The receiving node does not check whether or not the wavekey is in use indicating its participation in a currently active light path. Since Walk is concerned with a potential light path to be set up in the future, the provisioning information stored in the node is used. A node responds with an ACK if the provisioning information indicates that the expected wavekey as indicated in the query is present, otherwise it sends a negative response.

Figure 6:
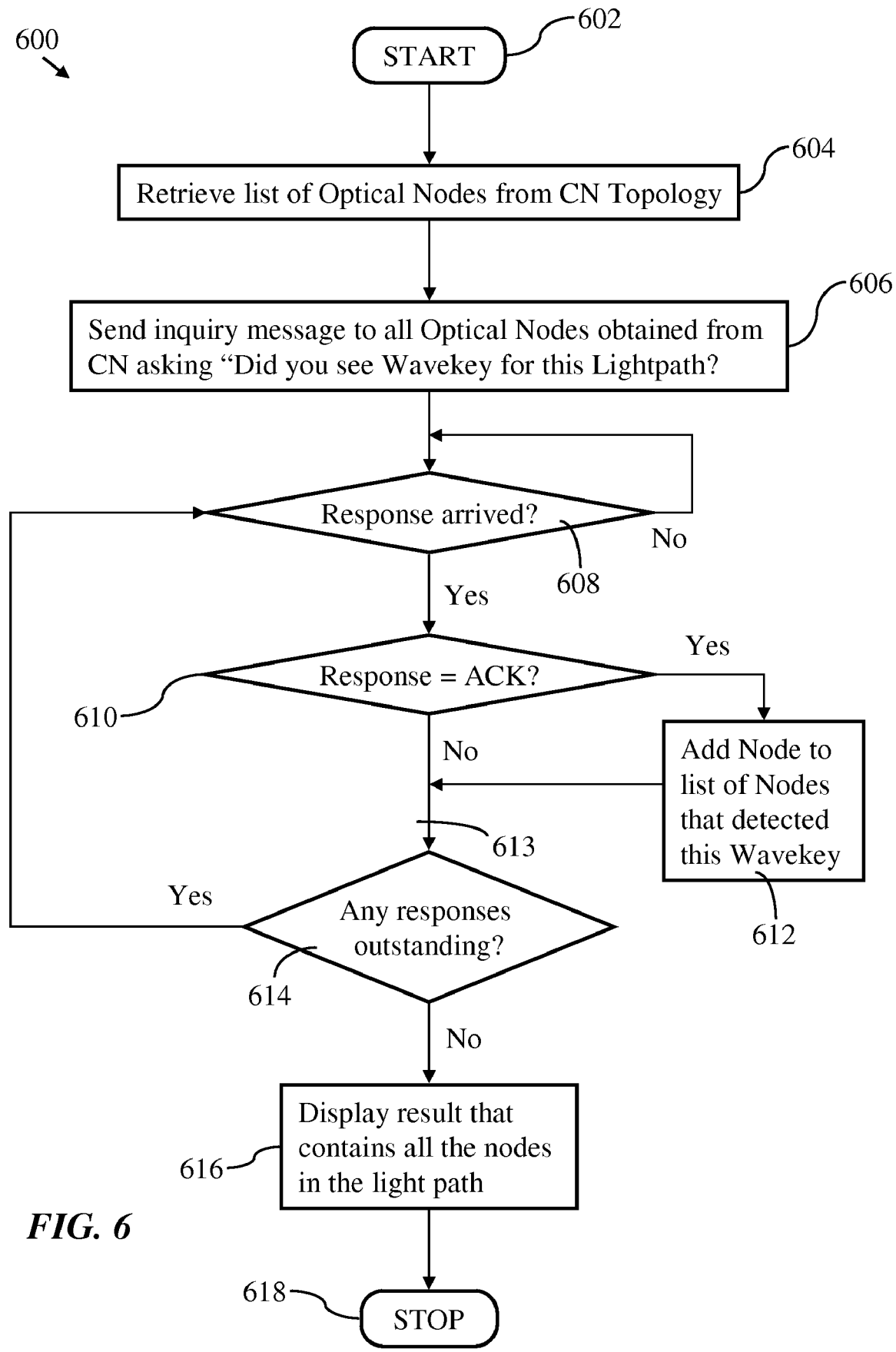
FIG. 6 presents a flowchart that illustrates steps of the procedure Global Discovery of the method for lightpath monitoring according to the embodiment of the invention.

The operations of procedure Global Discovery are explained with the help of flowchart 600 of FIG. 6. A concept called flooding of the OCN is used by this procedure. Upon start (box 602) the procedure retrieves the list of optical nodes in the OCN (box 604 in FIG. 6). The list of nodes is extracted by examining the CN topology information, which is readily available to every optical node. The procedure then sends an enquiry message to each of the nodes detected in step 604 asking whether the nodes have observed or detected the wavekey corresponding to the light path of interest. The procedure then enters box 608 where it awaits responses from all the optical nodes. Received responses from the optical nodes are processed in box 610. If the response from the optical node indicates "YES" confirming the detection of the specified wavekey, the node is added to the list of nodes confirmed to be on this lightpath (box 612). The procedure then moves to box 614 via 613. If the response indicates "NO", the procedure directly moves to box 614 where there is a check to determine if there are any responses outstanding. If not all optical nodes have responded (box 614), then the procedure returns to box 608 where it awaits future responses. Otherwise, if the outcome of box 614 is "NO", it is assumed that all optical nodes have responded. In this case, the final result is displayed in the form of all the optical nodes which have detected the wavekey and which are considered to be on the deployed light path. The procedure terminates in box 618.

Figure 7:
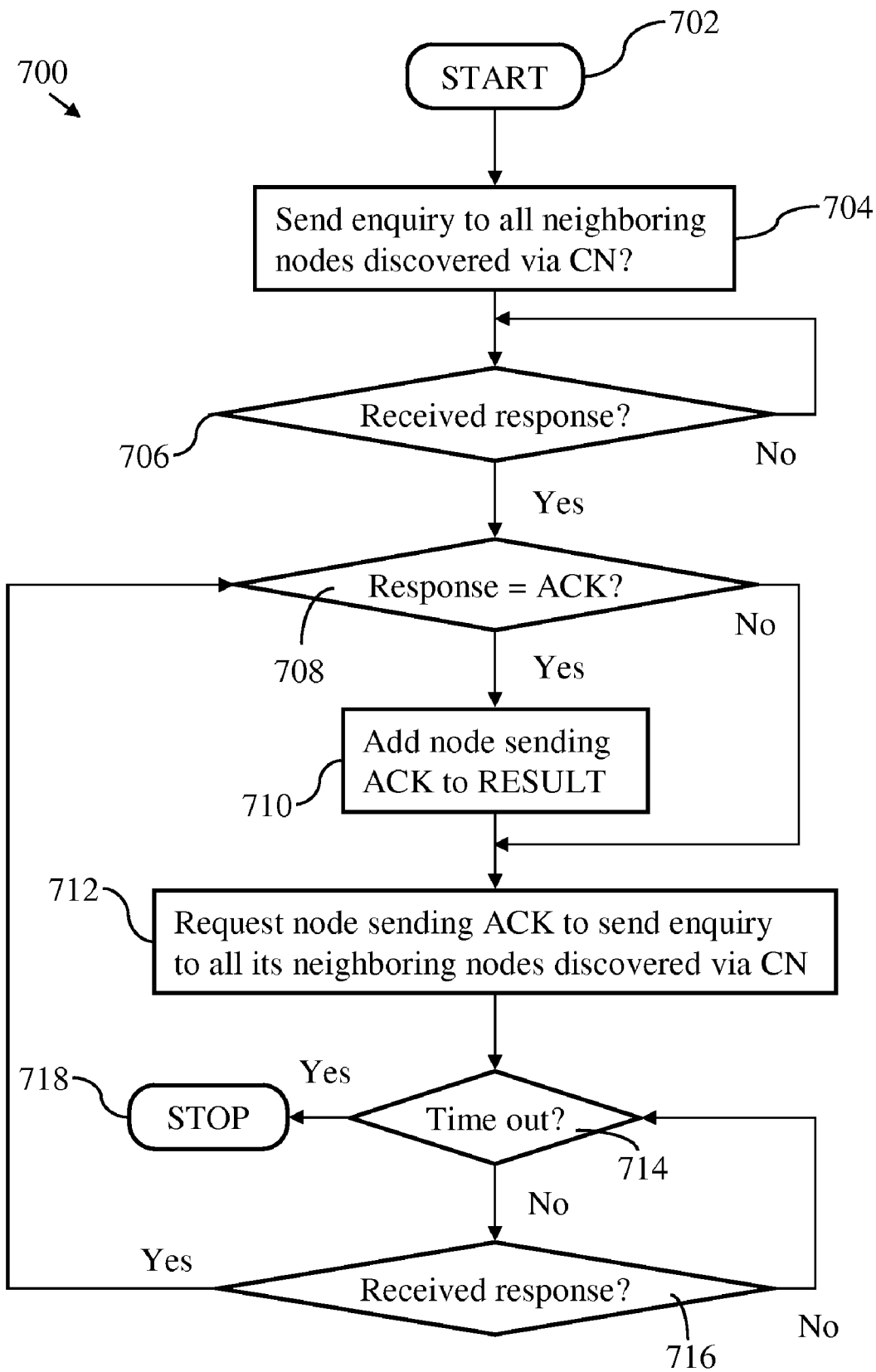
FIG. 7 presents a flowchart that illustrates steps of the procedure Local Discovery of the method for light path monitoring according to the embodiment of the invention.

The operations of procedure Local Discovery are explained with the help of flowchart 700 of FIG. 7. This procedure is applicable in the cases where there is at least one OSC card-pair connecting optical nodes that have fibre connections between them. Upon start (box 702) the procedure 700 executing at the start node sends messages to all its neighbouring nodes discovered via the available CN topology information, enquiring whether they have detected the wavekey corresponding to the light path (box 704). The procedure waits until a response arrives (box 706). Upon arrival of the response, the procedure exits "YES" from box 706 and checks the nature of the response. If the response is an acknowledgement (ACK), it exits "YES" from box 708 and adds the node sending the ACK to a list named RESULT that is initially empty (box 710). An ACK from a neighbouring node implies that the node has detected the specified wavekey, thus indicating that it is on the light path. The procedure sends a request to this neighbour to send an enquiry message to all its neighbours (that it discovers via the available CN topology information) in turn asking whether they have detected the specified wavekey (box 712). The neighbour's neighbours are to send their responses back to this start node on which the procedure (box 700) was invoked. The procedure enters a waiting phase checking for replies from other nodes (box 716) or the occurrence of a timeout (box 714). A node responds to an enquiry message only if it has detected the wavekey and has not responded to the start node earlier. With the reception of a response the procedure loops back to the entry of box 708 to check the nature of the response. If a time out occurs, it means that there are no more nodes left on the light path to respond to the start node and the procedure terminates (box 718). In case the response checked in box 708 is not an ACK, it will exit "NO" from Box 708 and the procedure goes to the entry of box 714 waiting for the occurrence of another response or the timeout.

An advantage of the method is that it does not require any NMS interaction and can be invoked at any node on a light path through a CLI.

Thus, a method and a system for monitoring a light path between a source and a destination node in an Optical Communication Network (OCN) are provided.

The processing described above may be performed by a general-purpose computing engine alone or in connection with a special purpose computer. Such processing may be performed by a single platform or by a distributed processing platform. In addition, such processing and functionality can be implemented in the form of special purpose hardware or in the form of software being run on a general-purpose computing platform. The procedures associated with the present embodiments may be stored in any storage device, such as for example, non-volatile memory, an optical disk, magnetic tape, or magnetic disk. Furthermore, the processes may be programmed when the system is manufactured or via a computer-readable medium at a later date. Any data handled in such processing or created as a result of such processing can be stored in any memory as is conventional in the art. By way of example, such data may be stored in temporary memory, such as in the RAM of a given computer system or subsystem.

Numerous modifications and variations of the present invention are possible in light of the above teachings. For example, instead of using a timeout in the Discovery procedure, each responding node can include the number of its neighbors. After receiving this number, start node can wait for the designated number of responses and the timeout is not necessary. Also, instead of responding nodes contacting their neighbours, they can provide the list of neighbours to the start node. The start node can then be responsible for contacting all the specified neighbours.

It is therefore to be understood that within the scope of the appended claims, the invention may be practiced otherwise than as specifically described herein.

What is claimed is:

1. A method for monitoring lightpaths in an optical network comprising a plurality of optical nodes, each associated with a respective nodal identifier, said optical nodes interconnected by wavelength-multiplexed links and exchanging control signals through a control network, the method comprising the steps of:
   modulating an optical signal of each lightpath by an identifying optical signature;
   storing at each optical node:
      identifiers of optical signatures of specific lightpaths designated to traverse said each optical node;
      identifiers of adjacent optical nodes designated to be along each lightpath from among said specific lightpaths: and
      identifiers of optical signatures detected at said each optical node;
   selecting, by a command-line interface communicatively coupled to a start optical node, a target lightpath connecting a source optical node to a destination optical node and traversing said start optical node;
   determining, by said command-line interface, a target optical signature stored at said start optical node and associated with said target lightpath;
   progressively communicating a first message comprising said target optical signature to adjacent optical nodes to determine a first sequence of optical nodes designated to form said target lightpath;
   progressively communicating a second message comprising said target optical signature to adjacent optical nodes to determine a second sequence of optical nodes actually receiving said target optical signature; and
   comparing said second sequence to said first sequence;
and
wherein the steps of determining, progressively communicating the first message, progressively communicating the second message, and comparing are performed without interacting with a centralized network management system.

2. The method of claim 1 wherein said first message and said second message are communicated though an external data network.

3. The method of claim 1 wherein the step of comparing comprises a further step of determining congruence of said first sequence and said second sequence to ascertain routing correctness of said target lightpath.

4. The method of claim 1, wherein said first sequence is determined as:
   a list of preceding nodes, each storing an identifier of said target optical signature, between said start optical node and said source optical node; and
   a list of succeeding nodes, each storing an identifier of said target optical signature, between said start optical node and said destination optical node.

5. The method of claim 1
wherein said second sequence is determined as:
- a list comprising each preceding node which detects said target optical signature along said target lightpath between said start optical node and said source optical node; and
- a list comprising each succeeding node which detects said target optical signature along said target lightpath between said start optical node and said destination optical node.

6. The method of claim 1 further comprising:
- sending from said command-line interface communicatively coupled to said start optical node, messages to all neighbouring nodes of said start optical node requesting each to indicate detection of said target optical signature, said all neighbouring nodes being discovered via topology information acquired through said control network;
- receiving, at said start optical node, acknowledgments from specific neighboring nodes which detect said target optical signature;
- adding identifiers of said specific neighboring nodes to a local-discovery list, said local-discovery list being initially an empty list;
- sending, from each specific neighboring node, messages to all successive neighboring nodes of said each specific neighboring node requesting indication of detection of said target optical signature, wherein said each successive neighboring node is discovered from available topology information;
- receiving, at said start optical node, an acknowledgment from each successive neighboring node which detects said target optical signature; and
- adding an identifier of said each successive neighboring node which detects said target optical signature to said local-discovery list;
- wherein said each successive neighboring node which detects said target optical signature responds only once to a request for indication of detection of said target optical signature.

7. The method of claim 1 further comprising:
- storing at said each start optical node a set of identifiers of all optical nodes in said optical network
- sending a message from said command-line interface communicatively coupled to said start optical node to each other optical node, said message containing an identifier of said target optical signature and an identifier of said start optical node, said message requesting each individual optical node which detects said target optical signature, to send a response to said start optical node said response including an identifier of said each individual optical node; and
- including said identifier of said each individual optical node which detects said target optical signature in a global-discovery list for comparison with said second sequence of optical nodes.

8. A method for monitoring lightpaths in an optical network comprising a plurality of optical nodes, each associated with a respective nodal identifier, said optical nodes interconnected by wavelength-multiplexed links and exchanging control signals through a control network, the method comprising the steps of:
- modulating an optical signal of each lightpath by an identifying optical signature;
- storing at each optical node, for each lightpath planned to traverse said each optical node:
  - an identifier of a respective optical signature; and
  - identifiers of adjacent optical nodes designated to be along said each lightpath;
- selecting a target lightpath connecting a source optical node to a destination optical node and a start optical node along said target lightpath, and by a command-line interface communicatively coupled to said start optical node:
  - determining a target optical signature stored at said start optical node and associated with said target lightpath;
  - progressively communicating a first message comprising said target optical signature to adjacent optical nodes to determine a first sequence of optical nodes designated to form said target lightpath;
  - progressively communicating a second message comprising said target optical signature to adjacent optical nodes to determine a second sequence of optical nodes actually receiving said target optical signature; and
  - comparing said second sequence to said first sequence;
wherein the step of progressively communicating said first message further comprises:
- identifying at said start optical node a current node towards said source optical node and designated to be on said target lightpath according to provisioning data stored at said start optical node;
- sending said first message from said start optical node to said current node, said current node being adjacent to said start optical node;
- responsive to an indication that said current node is said source optical node, receiving at said start optical node a completion indication from said current node;
- responsive to an indication that said current node is not said source optical node:
  - receiving, at said start optical node, an identifier of an identified preceding node from said current node, said preceding node being adjacent to said current node and designated to be on said target lightpath according to provisioning data stored at said current node;
  - setting said preceding node as a current node; and
  - returning to the step of sending said first message.

9. The method of claim 8 wherein the step of progressively communicating said first message further comprises:
- identifying at said start optical node a current node towards said destination optical node and designated to be on said target lightpath according to provisioning data stored at said start optical node;
- sending said first message from said start optical node to said current node, the current node being adjacent to said start optical node;
- responsive to an indication that said current node is said destination optical node, receiving at said start optical node a completion indication from said current node;
- responsive to an indication that said current node is not said destination optical node:
  - receiving, at said start optical node, an identifier of an identified succeeding node from said current node, the succeeding node being adjacent to said current node and
  - designated to be on said target lightpath according to provisioning data stored at said current node;
  - setting said succeeding node as a current node; and
  - returning to the step of sending said first message.

10. A method for monitoring lightpaths in an optical network comprising a plurality of optical nodes, each associated with a respective nodal identifier, said optical nodes interconnected by wavelength-multiplexed links and exchanging control signals through a control network, the method comprising the steps of:

modulating an optical signal of each lightpath by an identifying optical signature;
storing at each optical node, for each lightpath planned to traverse said each optical node:
an identifier of a respective optical signature; and
identifiers of adjacent optical nodes designated to be along said each lightpath;
selecting a target lightpath connecting a source optical node to a destination optical node and a start optical node along said target lightpath, and by a command-line interface communicatively coupled to said start optical node:
determining a target optical signature stored at said start optical node and associated with said target lightpath;
progressively communicating a first message comprising said target optical signature to adjacent optical nodes to determine a first sequence of optical nodes designated to form said target lightpath;
progressively communicating a second message comprising said target optical signature to adjacent optical nodes to determine a second sequence of optical nodes actually receiving said target optical signature; and
comparing said second sequence to said first sequence;
wherein the step of progressively communicating said second message further comprises:
identifying at said start optical node a current node towards said source optical node and designated to be on said target lightpath according to provisioning data stored at said start optical node;
sending said second message from said start optical node to said current node, said current node being adjacent to said start optical node;
responsive to an indication of absence of said target optical signature at said current node, receiving at said start optical node a completion indication from said current node;
responsive to an indication that said current node is said source optical node, receiving at said start optical node a completion indication from said current node;

responsive to an indication that said current node is not said source optical node:
receiving, at said start optical node, an identifier of an identified preceding node from said current node, said preceding node being adjacent to said current node and designated to be on said target lightpath according to provisioning data stored at said current node;
setting said preceding node as a current node; and
returning to the step of sending said second message.

11. The method of claim 10 wherein the step of progressively communicating said second message further comprises:
identifying at said start optical node a current node towards said destination optical node and designated to be on said target lightpath according to provisioning data stored at said start optical node;
sending said second message from said start optical node to said current node, the current node being adjacent to said start optical node;
responsive to an indication of absence of said target optical signature at said current node, receiving at said start optical node a completion indication from said current node;
responsive to an indication that said current node is said destination optical node, receiving at said start optical node a completion indication from said current node;
responsive to an indication that said current node is not said destination optical node:
receiving, at said start optical node, an identifier of an identified succeeding node from said current node, said succeeding node being adjacent to said current node and designated to be on said start target lightpath according to provisioning data stored at said current node;
setting said succeeding node as a current node; and
returning to the step of sending said second message.

* * * * *